US012793891B2

(12) United States Patent
Bonen

(10) Patent No.: US 12,793,891 B2
(45) Date of Patent: Nov. 10, 2026

(54) INCREASING LIFESPAN OF SUPERCAPACITORS WITH A THERMOELECTRIC COOLER (TEC)

(71) Applicant: Harmonic, Inc., San Jose, CA (US)

(72) Inventor: Adi Bonen, North York (CA)

(73) Assignee: Harmonic, Inc., San Jose, CA (US)

( * ) Notice: Subject to any disclaimer, the term of this patent is extended or adjusted under 35 U.S.C. 154(b) by 143 days.

(21) Appl. No.: 18/815,729

(22) Filed: Aug. 26, 2024

(65) Prior Publication Data

US 2025/0079078 A1 Mar. 6, 2025

Related U.S. Application Data

(60) Provisional application No. 63/536,373, filed on Sep. 1, 2023.

(51) Int. Cl.

*H01G 2/08* (2006.01)
*F25B 21/00* (2006.01)

(52) U.S. Cl.

CPC ............... *H01G 2/08* (2013.01); *F25B 21/00* (2013.01)

(58) Field of Classification Search

CPC .......... H01G 2/08; H01G 11/08; H01G 11/10; H01G 11/18; F25B 21/02

See application file for complete search history.

(56) References Cited

U.S. PATENT DOCUMENTS 6,326,761 B1 * 12/2001 Tareilus ................ H02M 7/003 318/722
7,859,844 B2 12/2010 Nguyen et al.
(Continued)

FOREIGN PATENT DOCUMENTS

CN 110223846 A * 9/2019 ............ F24F 1/0375
CN 110942920 A * 3/2020 ............ H01G 11/18
(Continued)

OTHER PUBLICATIONS

CN-110223846-A Machine Translation (Year: 2019).*
(Continued)

*Primary Examiner* — Nathan Milakovich
(74) *Attorney, Agent, or Firm* — Brokaw Patent Law, PC; Christopher J. Brokaw

(57) ABSTRACT

Extending the operational lifespan of a supercapacitor. A device, deployable in temperatures reaching or extending outside a nominal industrial temperature range, comprises a power supply, backup power supply, and thermoelectric cooler control module. The backup power supply comprises one or more supercapacitors, one or more temperature sensors, and one or more thermoelectric coolers (TECs). The control module instructs the TECs to regulate operation of removing heat from the supercapacitors based upon temperature data received from the temperature sensors. An insulated enclosure may enclose the supercapacitors, temperature sensors, TECs, and optionally the thermoelectric cooler control module to further prevent the supercapacitors from overheating. The thermoelectric cooler control module may change the rate at which the temperature of the supercapacitors is reduced in response to detecting a change in temperature difference between the external environment and the supercapacitors.

5 Claims, 4 Drawing Sheets

(56) References Cited

U.S. PATENT DOCUMENTS

| | | | | |
|---|---|---|---|---|
| 11,361,909 | B2 | 6/2022 | Ding et al. | |
| 2007/0024266 | A1* | 2/2007 | Yurgil | H01G 11/14 324/76.11 |
| 2017/0256833 | A1* | 9/2017 | Ciaccio | B60L 50/66 |
| 2018/0368293 | A1* | 12/2018 | Bultitude | H10N 10/17 |
| 2023/0038175 | A1* | 2/2023 | McConnell | H01G 2/08 |
| 2023/0223784 | A1* | 7/2023 | Cronin | H02J 7/345 320/167 |

FOREIGN PATENT DOCUMENTS

| | | | |
|---|---|---|---|
| CN | 115692030 | A | 2/2023 |
| CN | 110462919 | B | 6/2023 |
| WO | 2021232970 | A1 | 11/2021 |

OTHER PUBLICATIONS

CN-110942920-A Machine Translation (Year: 2020).*
Numan Arshid, Mohammad Khalid, and Andrews Nirmala Grace, Index of Advances in Supercapacitor and Supercapacity, Innovations in Energy Storage Devices, 2020, Elsevier Inc., Oxford, England.
English translation of PCT Patent Application 2021232970 obtained from www.patents.google.com on May 21, 2026.
English translation of China Patent Application 115692030 obtained from www.patents.google.com on May 25, 2026.
English translation of China Patent Application 110462919 obtained from www.patents.google.com on May 25, 2026.

* cited by examiner

INCREASING LIFESPAN OF SUPERCAPACITORS WITH A THERMOELECTRIC COOLER (TEC)

CLAIM OF PRIORITY

The present application claims priority to U.S. Provisional Patent Application No. 63/536,373, filed on Sep. 1, 2023, entitled 'Increasing Lifespan of Supercapacitors with a Thermoelectric Cooler (TEC),' the entire contents of which are incorporated by reference for all purposes as if fully set forth herein.

FIELD OF THE INVENTION

Embodiments of the invention relate to extending the operational lifespan of a supercapacitor.

BACKGROUND

A supercapacitor is a high-capacity capacitor that has a higher capacitance value than other capacitor types, although typically with lower voltage limits. Supercapacitors do not use a solid dielectric as used by conventional capacitors, but instead, use electrostatic double-layer capacitance and electrochemical pseudocapacitance. Supercapacitors possess a very high energy density, which allows for storing a large amount of energy in a relatively small volume. The energy density of supercapacitors is substantially higher than that of conventional electrolytic capacitors. These qualities of supercapacitors make them a good choice as a power source for providing backup power in situations where batteries are not suitable.

In practice, the use of supercapacitors to supply backup power is limited to devices operating in a restricted range of temperatures; indeed, supercapacitors are well-suited for use in climate-controlled environments. While supercapacitors can possibly perform across the nominal industrial temperature range of −40 to +85° C. (degrees Celsius), their performance will be substantially degraded at the edges of that temperature range.

Worse still, the life expectancy of a supercapacitor is strongly affected by its temperature. In fact, supercapacitors life expectancy is typically substantially shorter than 1 year when operating at or near the top end of its rated operating conditions (typically 60° C. to 85° C.). Even derating a supercapacitor, so that it is operating at some fraction of its rated operating conditions, is insufficient to achieve sufficient life expectancy when the supercapacitor is operating at higher temperatures near or at the top of the industrial temperature range.

The life expectancy of supercapacitors declines substantially while operating at higher temperature. For example, a rise in operating temperature from 75° C. to 85° C. reduces the typical supercapacitor life expectancy by a factor of 2 to 2.5. As a rule of thumb, the life expectancy of a supercapacitor is reduced by a factor of 2 to 2.5 for every 10° C. increase in its operating temperature that is typically experienced at the top of its allowed operating range. Thus, equipment that is expected to operate at temperatures at or near the top range of the industrial temperature range is often prevented from using supercapacitors due to their limited life expectancy at these temperatures.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for extending the operational lifespan of a supercapacitor when used in a device deployed in temperatures approaching and/or exceeding the nominal industrial temperature range are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention are directed towards extending the operational life expectancy of a supercapacitor when the supercapacitor is used in a device subjected to high temperatures, i.e., temperatures approaching or exceeding the upper limit of the nominal industrial temperature range of −40 to +85° C. The operational life expectancy of a supercapacitor in such an environment may be extended by an active cooling mechanism which cools the supercapacitor when the device is experiencing high temperatures that could impact the operational life of the supercapacitor. Advantageously, when the device is not experiencing temperatures that could impact the operational life of the supercapacitor, the active cooling mechanism need not expend power to cool the supercapacitor, thereby saving power.

Figure 1:
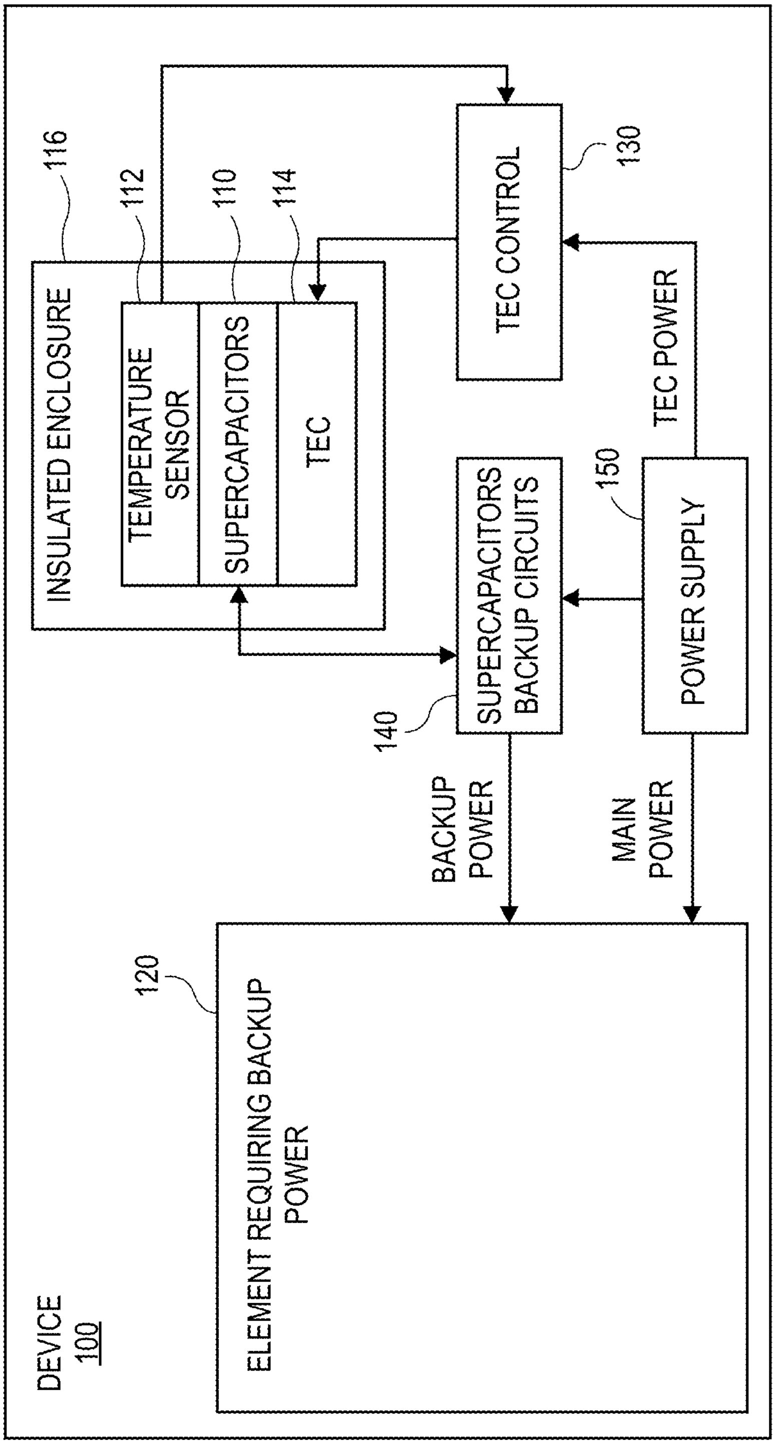
FIG. 1 is a block diagram of a device comprising one or more supercapacitors whose operational life is being extended by an embodiment of the invention.

FIG. 1 is a block diagram of a device 100 comprising one or more supercapacitors 110 whose operational life can be extended by an embodiment of the invention. Device 100, as broadly used herein, refers to any physical article of manufacture that may comprise and use one or more supercapacitors 110. Under ideal circumstances, the internal workings of device 100, including but not limited to elements 120, TEC control 130, and backup circuits 140, are supplied power provided by power supply 150. However, the responsibilities of device 100 are such that it is desirable to ensure that one or more elements 120 of device 100 continue to receive uninterrupted power in the event that power supply 150 fails or otherwise becomes inoperable. Thus, in the event that the main power source provided by power supply 150 is lost or otherwise becomes inoperable, backup circuits 140, receiving backup power from one or more supercapacitors 110, operate to ensure that to one or more elements 120 continue to receive backup power supplied by one or more supercapacitors 110 without interruption.

The active cooling mechanism of an embodiment includes one or more thermoelectric coolers (TEC) 114. A TEC is a solid-state device capable of drawing heat away from one of its sides to its opposing side. TECs have a smaller stature than heat pumps, such as the heat pumps typically used within a refrigerator or air conditioner. Advantageously, the smaller size and solid-state nature of a TEC allows for it to accommodate the various constraints and form factors associated with devices in which a supercapacitor can be used for a backup power supply. One or more TECs 114 may be physically adjacent and/or touching one or more supercapacitors 110; alternately, a heat conductor may be situated in-between the one or more supercapacitors 110 and the one or more TECs 114.

As shown in FIG. 1, one or more temperature sensors 112 may be used to measure the temperature of the environment in which device 100 is employed as well as the temperature of one or more supercapacitors 110. One or more TECs 114 may cause the temperature of one or more supercapacitors 110 to lower significantly relative to the environment in which it is employed. The operation of the one or more TECs 114 is controlled by a thermoelectric cooler control module ("TEC control") 130 that regulates the operation of the one or more TECs 114 in removing heat from one or more supercapacitors 110 based upon temperature data received from one or more temperature sensors 112.

Embodiments can utilize a thermal insulation material to form an insulated enclosure 116 around one or more supercapacitors 110 to reduce undesirable heat transfer from a potentially hotter environment, or even the device 100 itself, to the one or more supercapacitors 110, which may be artificially colder due to the one or more TECs 114. The use of insulated enclosure 116 is optional, as not all embodiments may use insulated enclosure 116. While FIG. 1 depicts TEC control 130 as residing outside insulated enclosure 116, in other embodiments not depicted in FIG. 1, TEC control 130 may be integrated, in whole or in part, with one or more components disposed inside insulated enclosure 116.

Figure 2:
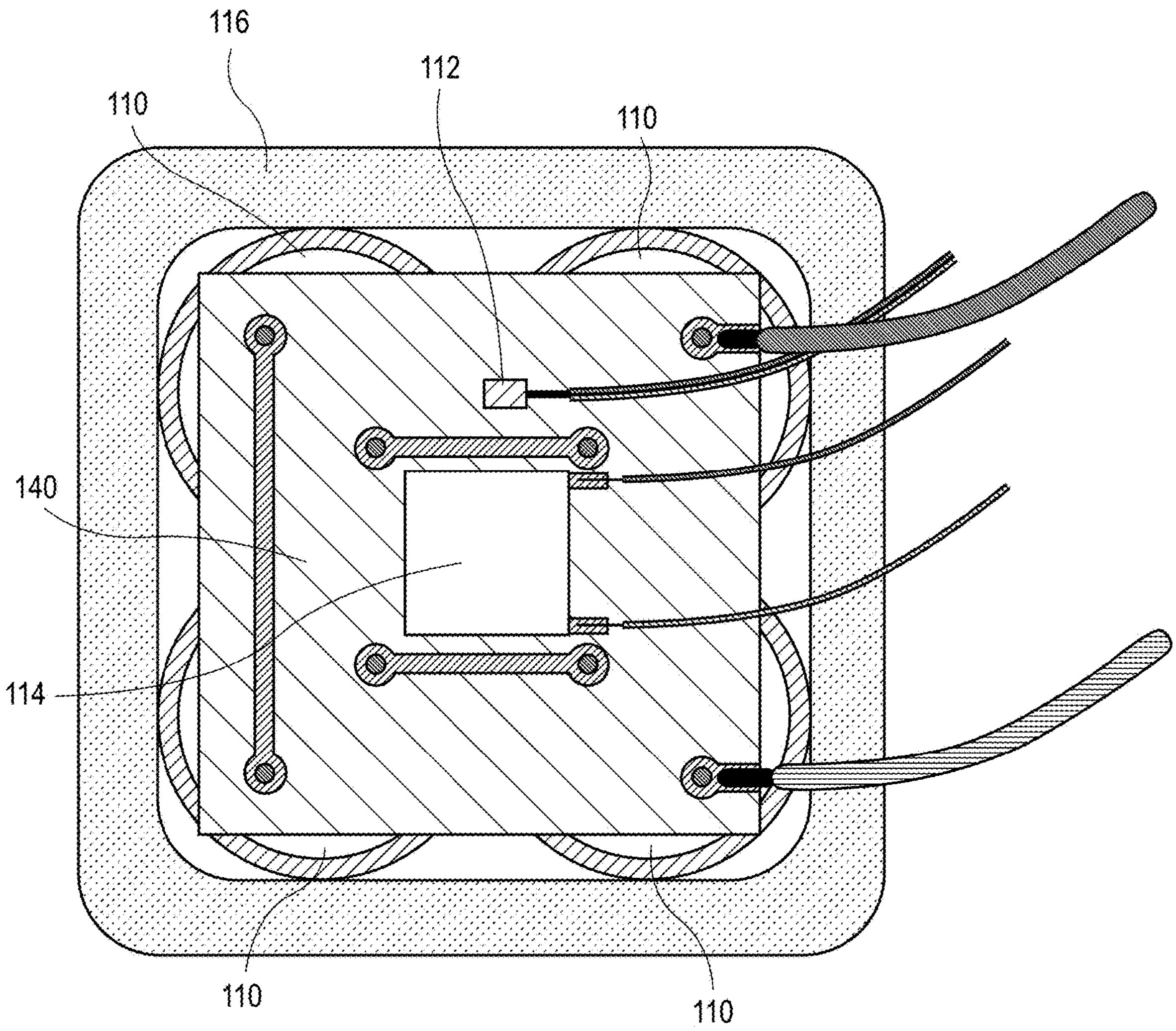
FIG. 2 is a top view of the insulated enclosure with the removable cover removed in accordance with an embodiment of the invention.

Insulated enclosure 116 may possess a removable cover. FIG. 2 is a top view of the insulated enclosure 116 with its removable cover removed in accordance with an embodiment of the invention. As shown in FIG. 2, a temperature sensor 112 is disposed on the supercapacitor backup circuits 140, although temperature sensors 112 may be located elsewhere in other locations not depicted.

Figure 3:
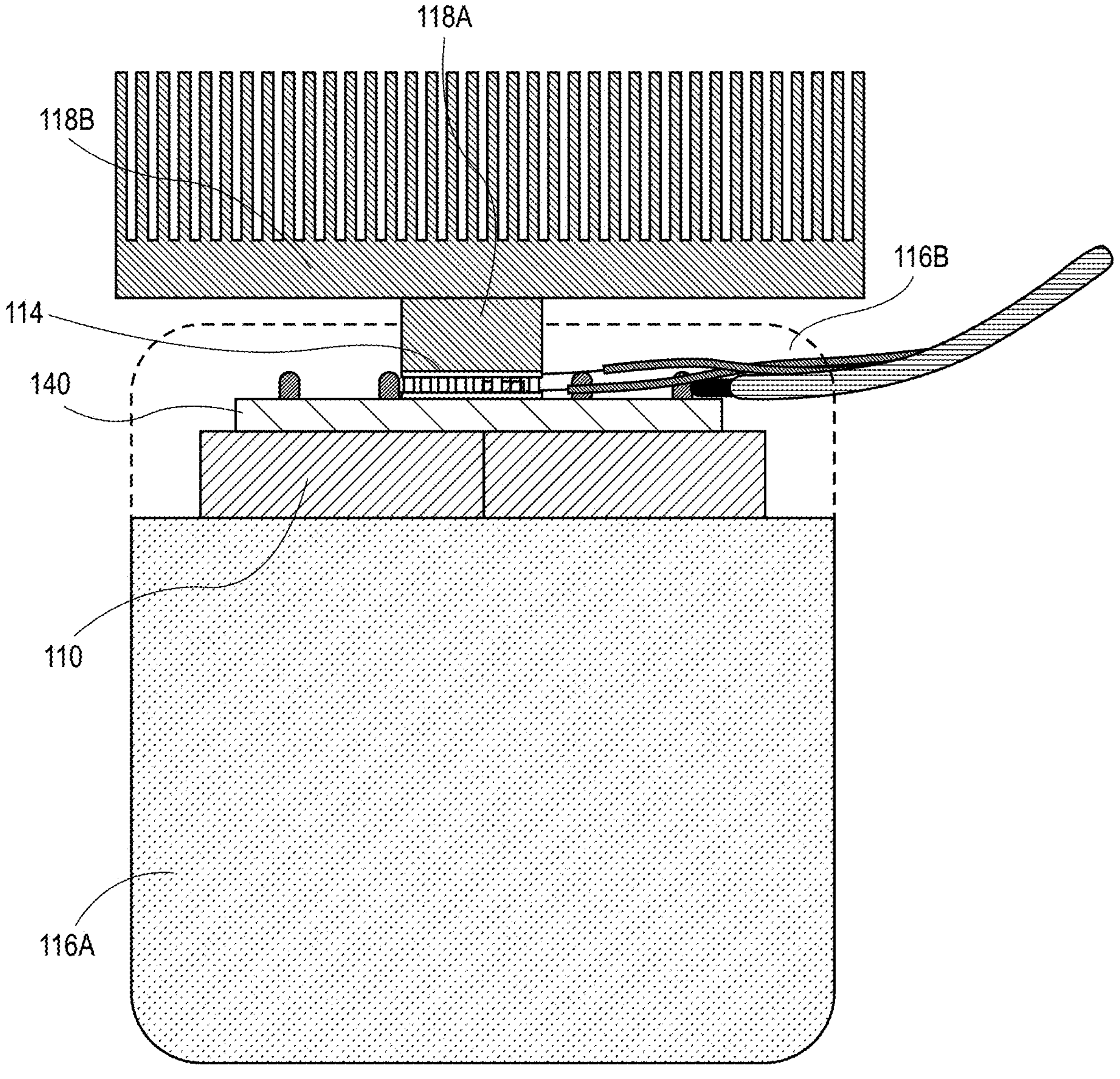
FIG. 3 is a side view illustration of an insulated enclosure comprising a base and a removable cover in accordance with an embodiment of the invention.

FIG. 3 is a side view illustration of an insulated enclosure comprising a base 116A and a removable cover 116B in accordance with an embodiment of the invention. FIG. 3 depicts a heat sink that protrudes through removeable cover 116B to enable heat transfer from the hot side of TEC 114 to either the exterior of the insulated enclosure or to the exterior of device 100. In other embodiments of the invention not shown in FIG. 3, the heat sink may serve the same purpose but may protrude through base 116A of the insulated enclosure rather than through removable cover 116B.

The heat sink may be composed of one or more parts. For example, the heat sink depicted in FIG. 3 includes heat conductor 118A and heat sink 118B. Heat conductor 118A conducts heat between the hot side of TEC 114 and heat sink 118B. Heat sink 118B conducts heat between heat conductor 118A and either the exterior of enclosure 116 or directly to the exterior of device 100.

In the steady state condition of the power backup mechanism, energy is already stored in the one or more supercapacitors 110, and very little energy is consumed by the power backup mechanism. Specifically, the one or more supercapacitors 110 themselves consume a very small amount of power, which is due to internal current leakage inside each supercapacitor. Such leakage power often amounts to only several milliwatts. Thus, the amount of heat that the one or more TECs 114 are required to move from the cold supercapacitor area to the hot environment is largely governed by the efficiency of the thermal insulation around the supercapacitors.

TEC control 130 can use temperature sensor 112 to measure the temperature around the one or more supercapacitors 110, and use a control loop to bring that temperature to a desired target value. By doing so, the TEC cooling mechanism will consume only the amount of power required to bring the temperature of the one or more supercapacitors 110 to a target value which guarantees a certain desired life expectancy, and will consume less power or no power at all if less or no cooling is required. In an embodiment, the target value of temperature to which the TEC control 130 uses a control loop to achieve may be adjusted, e.g., TEC control 130 may receive new instructions from a managing entity from over a network or may adjust the target value on its own based on the temperatures device 100 has experienced or is expected to experience as measured by its own temperature sensors.

A temperature control loop combined with efficient insulation can restrict the power spent by the one or more TECs 114 to cool the one or more supercapacitors 110 to extend the life expectancy of the one or more supercapacitors 110 to an acceptable level. Among the operating principles observed by TEC control 130 is that the more heat that is required to be moved from the cold side to the hot side of each TEC 114, the more power has to be spent to do so. Since more power is consumed by each TEC 114 as the temperance difference between the environment and the one or more supercapacitors 110 increases, TEC control 130 may reduce the rate at which heat is transferred through a TEC 114 when reducing the temperature of the one or more supercapacitors 110 to conserve energy. Similarly, when a temporary large difference is detected between the actual and desired temperatures of one or more supercapacitors 110, TEC control 130 may use higher or lower rates of heat transfer through the one or more TECs 114 as governed by instructions from a managing entity. A large difference between the actual and desired temperatures of one or more supercapacitors 110 may be a result of a short-term heating of the supercapacitors due to energy discharge when the backup power in the supercapacitors is utilized, followed by another short-term heating of the supercapacitors during recharge. Such a short duration of higher supercapacitors temperature is typically several minutes long, and has a negligible effect on their overall lifespan.

Figure 4:
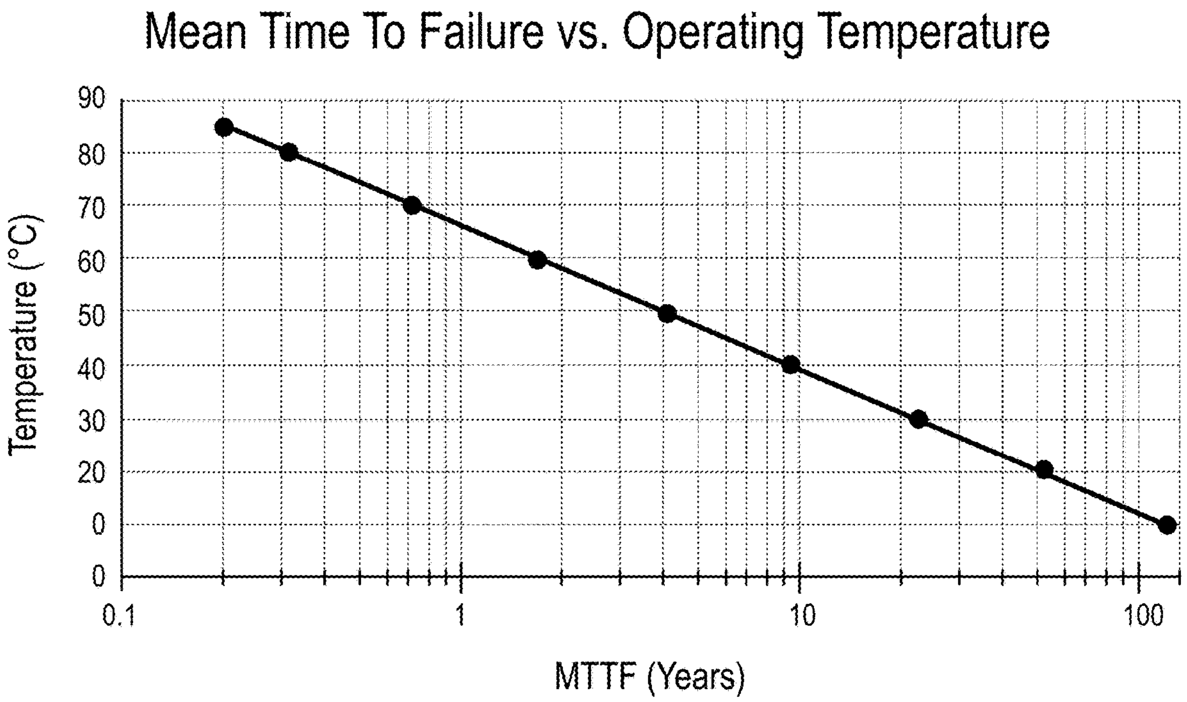
FIG. 4 is a graph of mean time to failure versus operating temperature of a typical supercapacitor in accordance with an embodiment of the invention.

FIG. 4 is a graph of mean time to failure versus operating temperature of a typical supercapacitor in accordance with an embodiment of the invention. As shown in FIG. 4, by use of embodiments of the invention, the expected life of one or more supercapacitors 110 is substantially extended such that it can be sufficient not to reduce the overall expected life of device 100. For example, when an embodiment of the invention is used to reduce the steady state temperature of supercapacitors 110 inside a device 100 operating at 80° C. to 40° C., supercapacitors 110 lifespan can be increased from about 0.3 years to 9.5 years. The substantial increase of expected life of one or more supercapacitors 110 can provide sufficient assurance that elements 120 can continue to receive backup power in the event that main power is lost for a period of time.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for extending an operational lifespan of a supercapacitor when used in a device deployed in temperatures approaching or exceeding a nominal industrial temperature range, comprising:

a thermoelectric cooler control module that instructs one or more thermoelectric coolers (TECs) to regulate operation of removing heat from one or more supercapacitors based upon temperature data received from one or more temperature sensors to extend the operational life expectancy of the one or more supercapacitors by bringing the temperature of the one or more supercapacitors to a target value which guarantees a certain desired life expectancy, wherein said target value is cooler than, and distinct from, an upper end of said nominal industrial temperature range, and wherein said thermoelectric cooler control module, said one or more supercapacitors, said one or more temperature sensors, and said one or more TECs are comprised within a backup power supply of said device.

2. The method of claim 1, wherein said one or more supercapacitors, said one or more temperature sensors, and said one or more thermoelectric coolers (TECs) are comprised within an insulated enclosure.

3. The method of claim 1, wherein said one or more supercapacitors, said one or more temperature sensors, said one or more thermoelectric coolers (TECs), and said thermoelectric cooler control module are comprised within an insulated enclosure.

4. The method of claim 1, wherein said thermoelectric cooler control module changes a rate at which the temperature of the one or more supercapacitors is reduced in response to detecting a change in temperature difference between an external environment of said device and said one or more supercapacitors.

5. The method of claim 1, wherein a target temperature of said one or more supercapacitors to which said thermoelectric cooler control module uses a control loop to achieve is adjusted based, at least in part, upon data received from a managing entity received over a network.

* * * * *